United States Patent
Banatwala et al.

(10) Patent No.: US 9,294,525 B2
(45) Date of Patent: Mar. 22, 2016

(54) SOCIAL SHARING OF CONTACTS INFORMATION

(71) Applicant: International Business Machines Corporation, Armonk, NY (US)

(72) Inventors: Mustansir Banatwala, Hudson, NH (US); David A. Brooks, Arlington, MA (US); Maureen G. Leland, Bolton, MA (US); Siu Y. Maffa, Boxborough, MA (US); Scott H. Prager, Stratham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/260,672

(22) Filed: Apr. 24, 2014

(65) Prior Publication Data

US 2015/0312286 A1 Oct. 29, 2015

(51) Int. Cl.
- *G06F 21/00* (2013.01)
- *H04L 29/06* (2006.01)
- *H04L 29/08* (2006.01)

(52) U.S. Cl.
CPC .............. *H04L 65/403* (2013.01); *H04L 63/10* (2013.01); *H04L 67/10* (2013.01)

(58) Field of Classification Search
CPC ....................................................... H04L 63/10
See application file for complete search history.

(56) References Cited

U.S. PATENT DOCUMENTS

| 6,321,202 | B1 * | 11/2001 | Raveis, Jr. .................... 705/313 |
| 7,836,147 | B2 | 11/2010 | Reding et al. |
| 8,095,551 | B2 * | 1/2012 | Kountz et al. ................. 707/758 |
| 2002/0156895 | A1 | 10/2002 | Brown |
| 2006/0088038 | A1 * | 4/2006 | Ravula ................... G06Q 10/10 370/397 |
| 2010/0005520 | A1 | 1/2010 | Abbot et al. |
| 2010/0299340 | A1 * | 11/2010 | Murthy et al. ................ 707/759 |
| 2011/0119230 | A1 * | 5/2011 | Zuber ........................... 707/608 |
| 2012/0158744 | A1 * | 6/2012 | Tseng et al. .................. 707/748 |
| 2013/0215462 | A1 * | 8/2013 | Maki ..................... H04N 1/2195 358/1.15 |
| 2015/0172250 | A1 * | 6/2015 | Sharma .................. H04L 51/32 715/753 |

FOREIGN PATENT DOCUMENTS

| EP | 2345267 | 7/2011 |
| WO | WO2010038142 | 4/2010 |

OTHER PUBLICATIONS

List of IBM Patents or Patent Applications Treated As Related dated Nov. 11, 2015, 2 pages.

* cited by examiner

*Primary Examiner* — Fatoumata Traore
*Assistant Examiner* — Kendall Dolly
(74) *Attorney, Agent, or Firm* — Scully, Scott, Murphy & Presser, P.C.

(57) ABSTRACT

Sharing contact information among one or more communities or individuals in a social media environment, in one aspect, may comprise creating contact information associated with contact as social media content based on input from a first user. At least a portion of the contact information may be shared with a plurality of second users via a social media like application.

12 Claims, 3 Drawing Sheets

SOCIAL SHARING OF CONTACTS INFORMATION

FIELD

The present application relates generally to computers, and computer applications, and more particularly to computer-implemented social sharing of contacts information.

BACKGROUND

Currently existing methods and systems allow sharing of contacts information, e.g., by sending electronic business card (e.g., vcard) or other information the recipients can import into their address books. Other methods and systems allow sharing and accepting contact information based on server technology and may even offer ways to keep the contacts in sync via pull (e.g., request for updated information) or periodic push (e.g., transmit updated information if the updates occur) methods.

BRIEF SUMMARY

A method of sharing contact information among one or more individuals or communities in social media environment, in one aspect, may comprise creating contact information associated with a contact as social media content based on input from a first user. The method may also comprise allowing sharing of at least a portion of the contact information with a plurality of second users via a social media application. The allowing may comprise segmenting the contact information based on input from one or more of the first user and a user associated with the contact information, wherein one or more segments of the contact information can be designated for sharing and other of one or more of the contact information can be designated for not sharing, and providing a micro-blogging capability associated with the contact information for the plurality of second users to comment on the contact information. In one aspect, the comment may be shared.

A system for sharing contact information among one or more communities in a social media environment, in one aspect, may comprise a computer processor operable to create contact information associated with a contact as social media content based on input from a first user. A storage device may be operable to store the contact information. The computer processor may be further operable to allow sharing of at least a portion of the contact information with a plurality of second users via a social media application by at least segmenting the contact information based on input from one or more of the first user and a user associated with the contact information, wherein one or more segments of the contact information can be designated for sharing and other of one or more of the contact information can be designated for not sharing. The computer processor may be further operable to provide a micro-blogging capability associated with the contact information for the plurality of second users to comment on the contact information. In one aspect, the comment may be shared.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
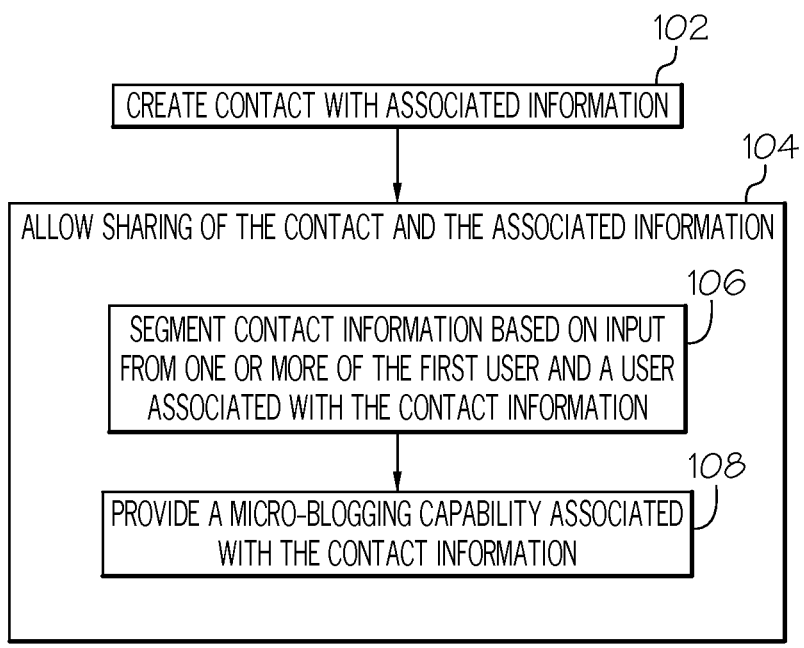
FIG. 1 is a flow diagram illustrating a method of the present disclosure in one embodiment.

In one embodiment of the present disclosure, contact information may be transformed into a piece of information that can be shared in an on-line social context, e.g., in a manner more in line with how content is shared, consumed and interacted with social media content. Social media generally refers to computer-implemented platform or service that allows people to interact, e.g., form one or more groups or communities and share information, e.g., content generated by people. Social media applications usually operate over the Internet, e.g., utilizing World Wide Web (web) and web site technology. Examples of social media may include social networking sites or applications, blogging sites or applications, micro-blogging sites or applications, and others.

In one aspect of the present disclosure, the contact is ameliorated by adding micro-blogging capabilities to contact records and sharing contacts with individuals or with social network communities. In another aspect, organization information of an entity may be utilized or transformed into contact information, e.g., using employees in the organization as contacts a hierarchy of contacts may be built from a business perspective and relevant data may be kept at multiple levels. A collaborative tool may be provided for building such a hierarchy of contact data. In this way, contact data may become more valuable both to the business and to the employees. By allowing users sharing the contact (or users in a community with a shared contact) to write comments and/or discussion notes on a contact, these users can share their insights with others in the organization that interact with the same person or with the same organization (if the contact is an organization). The user can also maintain personal notes on a contact, should there be information they do not want to share with others. The employer of the employees sharing information on a contact also benefits by not losing the contact data should an employee leave their organization—this shared contact data remains available to others.

A methodology of the present disclosure in one embodiment may promote data from an individual's copy of a contact to a shared record that always contains public data. Private data remains in a user's (or community's) copy of the contact. The methodology of the present disclosure in one embodiment may synchronize data between the private instance of the contact and the shared instance of the contact. However, in one embodiment, only the public fields may be synchronized such that the user's private notes or data are not shared. Whether a data field is public or private may be configurable, e.g., by a user, e.g., via a user interface (UI). Additionally, the methodology of the present disclosure may allow for private variants on public fields (e.g., first name=Katherine publicly, but Kate or Kathy in individual records). These private variants would represent private data copies of public fields—a user may opt out of synchronizing these fields with an explicit UI action.

In the present disclosure in one embodiment, a methodology is provided that makes contacts more social by adding social features to contacts in line with sharing content. A contact herein refers to contact information (e.g., identifier or name of a person and how the person can be reached, e.g., address, electronic mail (e-mail) address, and/or other information). Consider for example, a user creates a contact along with personal notes. The user can then share that contact with another user. The user can choose to share all information about the contact or a limited set of data associated with the contact. The contact keeps track of who created and shared the contact, and allows further re-sharing of the contact. The methodology of the present disclosure may also provide micro-blogging capability on the contact data.

The methodology of the present disclosure in one embodiment also allows sharing of contacts with communities, so that these pieces of information and all relevant information about them can be shared with a community where that would be beneficial. For example, in company A's community for company B, which tracks all the internal participants who belong to the different product teams which have deployed assets in company B, company A's community for company B can also contain contacts at company B, external people of company A as content.

Additionally, the contact content and micro-blogging can serve as a landing page to pull in information relevant to the contact (or to the organization in a company that the contact belongs to) from the activities/content pertaining to the ORG/contact. For example, a methodology of the present disclosure may be implemented as a World Wide Web ("web") application, similar to social media applications. Such application may treat contacts (contact information) as objects (e.g., social objects) that users can collaborate on and make notes about. For example, there may be a community having a web page (e.g., a start page) in a web application, where people (contact information) are listed together with recent comments about them. The web page may also show any comments and/or collaborative data added to a shared contact in an activity stream landing page for that community.

In one aspect, a methodology of the present disclosure may build social contacts where contacts are treated as pieces of information that can have a behavior similar to other pieces of content. For example, a contact can be shared in full, or partially (e.g., done by segmentation of contact data). In one embodiment of the present disclosure, provision for a private content area on the contact may always exist so users can make notes that they do not want to be shared with a larger audience. A contact may be also provided with a space for micro-blogging, which encourages the people sharing the contact to make public notes on the contact itself. The creator of the contact can determine if the contact he/she is sharing can be reshared by people he is sharing the contact with. Ownership of the contact can be transferred, or via reference counting the lifecycle of the contact can be tracked.

In another aspect, a methodology of the present disclosure may provide the provision of defining an organization (e.g., of a company or an entity) as a contact, which offers a place to keep higher level notes about the organization in general and also allows for discovering contacts that belong to that organization that one has access to. A user can also work with the contact and have emails from that contact appear in their activity stream for easier or central consumption. For instance, the application that implements the methodology of the present disclosure (like a social medial application) may have an activity stream such as timeline and wall in social media applications. The application collects data that is available to that activity stream. For example, if user writes a public note on a shared contact, the application triggers an event that would be consumed by an activity stream of the application. In response to the event trigger, the activity stream may pull the relevant data out of the event it was listening for, or if needed, read more data from the contact (e.g., if the data size is larger than the threshold size that could be put in the actual event). Contacts can be shared with other people, and they can also be shared with communities, via a shared contact page and can participate in directly referring to a specific community member (e.g., @mentions) and have business cards displayed along with a name reference.

Users who are sharing contacts can also allow their calendar entries appear on the contact. For example, consider a user who is one of the contacts that are being shared. The user's electronic calendar may have an entry that the user is meeting with person A at a specific time. This fact can be considered as another piece of information about the contact. The electronic calendar may be configured to automatically communicate this information with the application that implements the methodology of the present disclosure. The application may then update the information about the user (contact) on a shared contact page (e.g., presented by the application), e.g., so that others that share the contact would be aware of the contact's meeting with person A. For example, user A may have a contact from an organization, referred to as an organization contact, for simplicity of explanation. Other users who are sharing the organization contact can display certain entries of their calendar pertaining to that ORG on the contact.

A methodology of the present disclosure in one embodiment may form user contacts in an organization and create relationships among those contacts inside the organization responsive to detecting sharing of those contacts by the users. Consequently, the methodology may also discover and surface (or present) those contacts in relation to other content circulated in social media. For example, a user may see a micro-blog entry about company B and a co-employee asking for help reaching a certain department in company B, the methodology of the present disclosure may infer the context and display the contacts from the user's address book for easier re-sharing with the co-employee.

FIG. 1 is a flow diagram illustrating a method of the present disclosure in one embodiment. At 102, contact with associated information may be created, for example, as social media content, based on input from a first user. For instance, a methodology of the present disclosure may be implemented via an application or a functionality executing on a processor, e.g., hardware circuit. Such application may enable social sharing of contact information as social media content. A user may register with the application (e.g., similarly to registering with a social networking or media application), and create contacts for anyone, not limited to those of other registered users. The user may enter or input the contact and the associated information via a user interface (UI) of such application. Such UI may present a plurality of input fields for the user to populate. The user input contact and associated information may be stored on a storage device for further processing.

In another aspect, the user may input contact information from an organization chart of an entity. The input contact information may then be linked to that organization and organization chart. For example, a user may be enabled to enter the contact, and also enter the contact's organization, e.g., in an organization field, and the person's (contact's) job title, e.g., in a job title field. If an organization chart of the organization is available, the contact may be placed within the organization based on the input name, organization and job title. Even without an organization chart, the job title would provide the role of the contact within the organization. Contacts could also be imported from a corporate directory.

At 104, the application or like functionality (e.g., a social media application) allows or enables sharing of at least a portion of the contact information with a plurality of second users. For example, at 106 the contact information may be segmented based on input from one or more of the first user and a user associated with the contact information. One or more segments of the contact information can be designated for sharing and other of one or more of the contact information can be designated for not sharing. Such designation may be made by the first user and/or or the user associated with the contact information, e.g., if the user associated with the contact information is also a registered user of the application. At 108, the application may also provide a micro-blogging capability associated with the contact information for the plurality of second users (as well as the original contact owner) to comment on the contact information and the comment can be shared.

The contact and associated information that is stored, e.g., on a storage device may have levels of permissible accessibility for storing the segments of the contact information designated for sharing and not sharing, and the plurality of second users may have different levels of privileges to access the storage device. In addition, the first user that created the contact information may be initially designated to have ownership of the contact and the ownership of the contact can be transferred to another user. The first user may be allowed to designate whether one or more of the second users can share the contact information with one or more of third users with whom the one or more of the second users have social media relationship.

In one aspect, rather than one central share repository where each contact is stored for sharing once, different users of the system may share different copies of a contact. For example, user A may share contact John Smith with user B and user C. User D may share contact John Smith with user E and user F. The contact shared in the two groups remains independent, and the contextual notes/micro-blogging data remains meaningful to the individual groups. For example, each user may have an allocated data space for storing the user's contacts owned by that user. For instance, the John Smith contact owned by user A is a different piece of data from the John Smith contact record owned by user D. Contact records initially may be individual records that are not shared. Technically, they may be multiple different data records. Each record (e.g., each John Smith contact record) may point back to a common source of parent data (like an organization record). However, in one embodiment of the present disclosure, the contact records are distinct.

Figure 2:
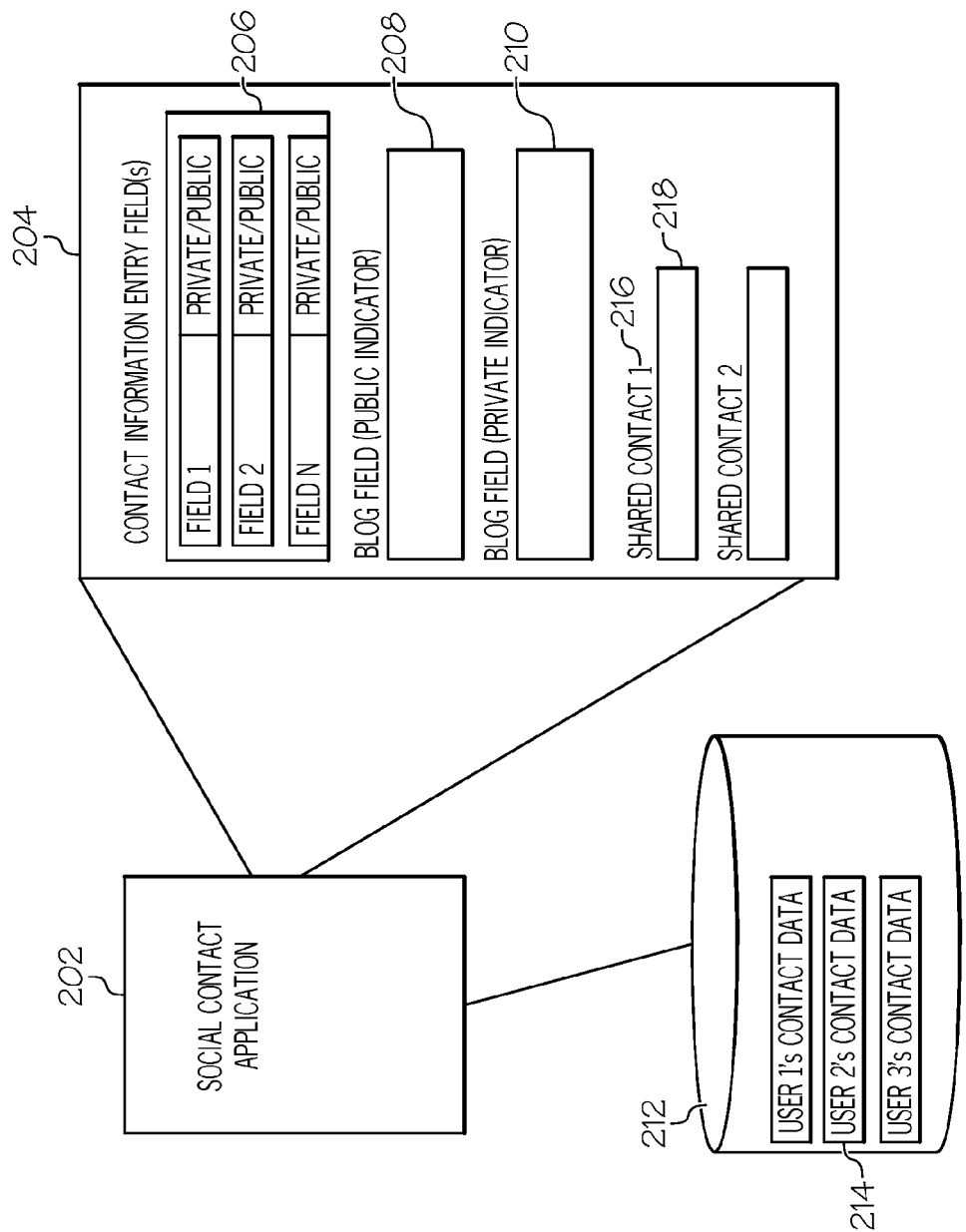
FIG. 2 illustrates a block diagram of an application and a user interface screen shot in one embodiment of the present disclosure that allows for sharing of contacts.

FIG. 2 illustrates a block diagram of an application (e.g., social media application) and a user interface screen shot in one embodiment of the present disclosure that allows for sharing of contacts. An application 202 in one embodiment may have similar functionalities as a social media application that allows users to form interest groups or communities and share information within the groups. The application 202 may comprise a program of instructions that execute on a hardware processor or circuit. A user interface 204 may be provided as part of the application that allows users to enter contact information, e.g., at 206, and also enter comments for blogging, e.g., at 208 and 210. The contact information field may include a plurality of sub-fields, into which different items of contact information may be entered, e.g., identification/email, e-mail, physical address, and other information about the contact. Each field may be marked as sharable (public) or not sharable (private). For instance, a checkbox or another mechanism may be employed to allow a user to specify whether the entered field is to be shared or not shared. In addition, the user interface may have one or more fields that allow a user to specify one or more other registered users with whom to share the contact information. Similarly, there may be different fields for entering blogs that can be shared or made public (e.g., 208) and blogs intended to be private and not shared (e.g., 210). The user interface page 204 (or another page of the user interface) may also show a list of existing contacts (e.g., 216) that are shared with others, for commenting via the blog fields (e.g., 218).

A user may register with the application 202 in order to utilize its functionalities, e.g., sharing contacts via social media. A registered user may specify contact information, e.g., via the user interface input page (e.g., 204). Any number of contacts may be specified. The contact information the user enters is stored in a storage device 212, in the user's own space (e.g., 214). Thus, in one embodiment, each registered user owns a copy of the contacts data the respective user enters.

Figure 3:
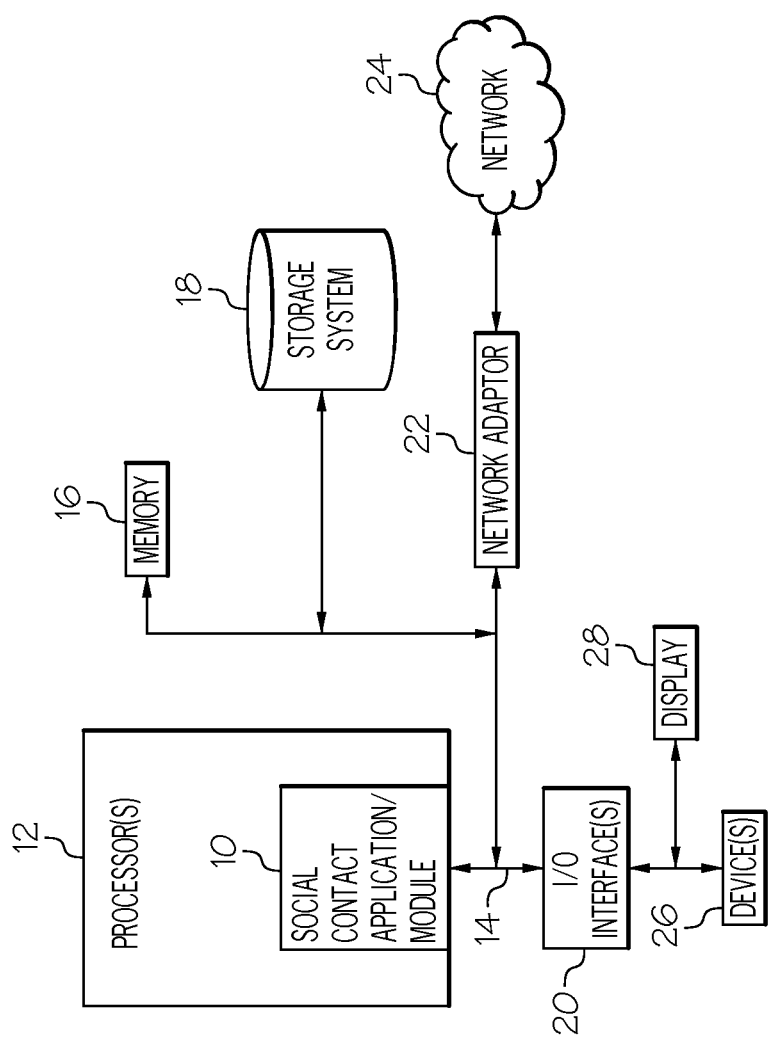
FIG. 3 illustrates a schematic of an example computer or processing system that may implement a contact sharing system in one embodiment of the present disclosure.

FIG. 3 illustrates a schematic of an example computer or processing system that may implement a contact sharing system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage medium storing a program of instructions when executed by a machine to perform a method of sharing contact information among one or more communities in a social media environment, the method comprising:
    creating, by a processor, contact information associated with a contact as social media content based on input from a first user;
    allowing, by the processor, sharing of at least a portion of the contact information with a plurality of second users via a social media application, the allowing comprising at least:
        segmenting, by the processor, the contact information based on input from one or more of the first user and a user associated with the contact information, wherein one or more segments of the contact information can be designated for sharing and other of one or more of the contact information can be designated for not sharing;
        providing a micro-blogging capability to the social media content comprising the contact information for the plurality of second users to comment on the contact information,
    wherein the providing micro-blogging capability comprises the social media application generating a user interface display with a blogging field to allow the plurality of second users connecting to a web site of the social media application over one or more computer communication networks to enter the comment associated with the contact information, wherein the comment is shared among the plurality of second users on the social media application's user interface display.

2. The computer readable storage medium of claim 1, further comprising providing a storage device that has levels of permissible accessibility for storing the segments of the contact information designated for sharing and not sharing, wherein the plurality of second users have different levels of privileges to access the storage device.

3. The computer readable storage medium of claim 1, wherein the first user that created the contact information is initially designated to have ownership and the ownership of the contact can be transferred.

4. The computer readable storage medium of claim 1, wherein the first user is allowed to designate whether one or more of the second users can share the contact information with one or more of third users which the one or more of the second users have social media relationship with.

5. The computer readable storage medium of claim 1, wherein the contact comprises an organization.

6. The computer readable storage medium of claim 1, wherein private variants of the segments of the contact information designated for sharing are created and stored as not sharable data.

7. The computer readable storage medium of claim 1, wherein said one or more segments of the contact information designated for sharing are shared with one or more of an individual or groups of users, or combinations thereof.

8. The computer readable storage medium of claim 1, wherein said one or more segments of the contact information designated for sharing are made public data and other of one or more of the contact information designated for not sharing is made private data.

9. A system of sharing contact information among one or more communities in a computer-implemented social media environment, comprising:
    a computer processor operable to create contact information associated with a contact as social media content based on input from a first user;
    a storage device operable to store the contact information;

the computer processor further operable to allow sharing of at least a portion of the contact information with a plurality of second users via a social media application by at least segmenting the contact information based on input from one or more of the first user and a user associated with the contact information, wherein one or more segments of the contact information can be designated for sharing and other of one or more of the contact information can be designated for not sharing, and providing a micro-blogging capability to the social media content comprising the contact information for the plurality of second users to comment on the contact information, wherein the providing micro-blogging capability comprises the social media application generating a user interface display with a blogging field to allow the plurality of second users connecting to a web site of the social media application over one or more computer communication networks to enter the comment associated with the contact information, wherein the comment is shared among the plurality of second users on the social media application's user interface display.

10. The system of claim 9, wherein the storage device has levels of permissible accessibility for storing the segments of the contact information designated for sharing and not sharing, wherein the plurality of second users have different levels of privileges to access the storage device.

11. The system of claim 9, wherein an electronic calendar activity of the contact is posted via the social media application.

12. The system of claim 9, wherein the contact comprises an organization.

\* \* \* \* \*